United States Patent
Blaine

(10) Patent No.: US 7,156,730 B1
(45) Date of Patent: Jan. 2, 2007

(54) METHOD AND SYSTEM FOR ACHIEVING ACCEPTABLE PROCESS TIME

(75) Inventor: George R. Blaine, Lake Stevens, WA (US)

(73) Assignee: FMC Technologies, Inc., Houston, TX (US)

( * ) Notice: Subject to any disclaimer, the term of this patent is extended or adjusted under 35 U.S.C. 154(b) by 258 days.

(21) Appl. No.: 10/980,896

(22) Filed: Jul. 21, 2004

Related U.S. Application Data

(60) Provisional application No. 60/489,151, filed on Jul. 21, 2003.

(51) Int. Cl.
A22C 21/00 (2006.01)

(52) U.S. Cl. ...................................... 452/150

(58) Field of Classification Search ............... 452/149, 452/150, 155, 156
See application file for complete search history.

(56) References Cited

U.S. PATENT DOCUMENTS

| | | | |
|---|---|---|---|
| 4,557,019 A | | 12/1985 | Van Devanter et al. |
| 4,868,357 A | | 9/1989 | Serikawa et al. |
| 4,875,254 A | | 10/1989 | Rudy et al. |
| 4,895,067 A | | 1/1990 | Ohji et al. |
| 4,962,568 A | | 10/1990 | Rudy et al. |
| 4,968,864 A | | 11/1990 | Doi et al. |
| RE33,904 E | | 4/1992 | Rudy et al. |
| 5,163,865 A | | 11/1992 | Smith |
| 5,251,141 A | * | 10/1993 | Payr ............................ 700/166 |
| 5,777,880 A | * | 7/1998 | Bowen et al. ............... 700/143 |
| 5,937,080 A | * | 8/1999 | Vogeley et al. .............. 382/110 |
| 6,164,174 A | * | 12/2000 | Sigurdsson et al. ............. 83/13 |
| 6,257,132 B1 | | 7/2001 | Bifulco |
| 6,407,818 B1 | | 6/2002 | Whitehouse |
| 6,520,228 B1 | * | 2/2003 | Kennedy et al. ............. 144/398 |
| 6,563,904 B1 | * | 5/2003 | Wijts et al. .................... 378/58 |
| 6,823,763 B1 | * | 11/2004 | Foster et al. ................... 83/100 |
| 6,882,434 B1 | * | 4/2005 | Sandberg et al. ............ 356/601 |
| 6,983,678 B1 | * | 1/2006 | Wattles et al. ................. 83/102 |
| 6,997,089 B1 | * | 2/2006 | Lindee et al. ................... 83/29 |
| 2003/0036344 A1 | | 2/2003 | Sigurdsson et al. |

* cited by examiner

Primary Examiner—Thomas Price
(74) Attorney, Agent, or Firm—Christensen O'Connor Johnson Kindness pllc

(57) ABSTRACT

A method and system for automatically portioning workpieces, such as meat products, into pieces having acceptable process time (e.g., acceptable cook time) are provided. The method includes generally five steps. First, measurement data of a workpiece carried on a conveyor are obtained. Second, a tentative cut path to portion the workpiece into one or more portions is defined based on the measurement data. Third, each portion is divided into one or more virtual sections and process-time data (i.e., cook-time data) for each virtual section is calculated according to a predefined process-time algorithm. Fourth, it is determined whether the process-time data of each of all the virtual sections of the portion to be cut from the workpiece fall within predefined process-time constraints. If no, fifth, the tentative cut path is redefined, and the method returns to the third step until the process-time data for all the virtual sections fall within the predefined process-time constraints.

20 Claims, 3 Drawing Sheets

METHOD AND SYSTEM FOR ACHIEVING ACCEPTABLE PROCESS TIME

CROSS-REFERENCE TO RELATED APPLICATION

This application is based on, and claims priority from, U.S. Provisional Application No. 60/489,151, filed Jul. 21, 2003.

FIELD OF THE INVENTION

The present invention relates generally to processing workpieces such as food products, and more specifically, to automatically cutting workpieces into pieces such that the time required to process (e.g., cook) each portioned piece is within acceptable limits.

BACKGROUND OF THE INVENTION

Workpieces, including food products, are cut or otherwise portioned into smaller portions by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, so as to use the chicken breast most effectively.

Portioning and/or trimming of the workpiece can be carried out by various cutting devices, including high-speed liquid jet cutters (liquids may include, for example, water or liquid nitrogen) or rotary or reciprocating blades, after the food product is transferred from the infeed to a cutting conveyor. Once the portioning/trimming has occurred, the resulting portions are off-loaded from the cutting conveyor and placed on a take-away conveyor for further processing or, perhaps, to be placed in a storage bin.

Portioning machines of the foregoing type are known in the art. Such portioning machines, or portions thereof, are disclosed in prior patents, for example, U.S. Pat. Nos. 4,962,568 and 5,868,056, which are incorporated by reference herein. As typical, the portioning machine includes an infeed conveyor having a moving, solid belt that slides over a support structure. The infeed conveyor belt is driven at a selected speed by a drive motor. The drive motor can be composed of a variable speed motor to thus adjust the speed of the infeed belt. The workpieces are carried on the infeed conveyor belt to be scanned and then are transferred to a cutting conveyor, typically constructed with a conveyor belt of open mesh metal material. The workpieces are cut/portioned/trimmed while on the cutting conveyor.

The workpieces are first carried by the infeed conveyor past a scanning station, where the workpieces are scanned to ascertain selected physical parameters, for example, their size and shape, and then determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt to define a sharp shadow or light stripe line, with the area forwardly of the transverse beam being dark. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly on the workpiece and the shadow line/light stripe. The video camera detects the displacement of the shadow line/light stripe from the position it would occupy if no workpiece were present on the conveyor belt. This displacement represents the thickness of the workpiece along the shadow line/light stripe. The length of the workpiece is determined by the length of belt travel that shadow lines/light stripes are created by the workpiece. In this regard, an encoder is integrated into the infeed conveyor, with the encoder generating pulses at fixed distance intervals corresponding to the forward movement of the conveyor.

In lieu of a video camera, the scanning station may instead utilize an x-ray apparatus for determining the physical characteristics of the workpiece, including its shape, mass, and weight. X-rays may be passed through the object in the direction of an x-ray detector. Such x-rays are attenuated by the workpiece in proportion to the mass thereof. The x-ray detector is capable of measuring the intensity the x-rays received thereby after passing through the workpiece. This information is utilized to determine the overall shape and size of the workpiece, as well as the mass thereof. An example of such an x-ray scanning device is disclosed by U.S. Pat. No. 5,585,603, incorporated by reference herein.

The data and information measured/gathered by the scanning devices is transmitted to a computer, preferably on board the portioning apparatus, which records the location of the workpiece on the conveyors as well as the shape and other parameters of the workpiece. With this information, the computer determines how to optimally cut or portion the workpiece at the portioning station, and the portioning may be carried out by various types of cutting/portioning devices including high-pressure liquid jets as disclosed in U.S. Pat. Nos. 4,875,254, 5,365,816, and 5,868,056. Other types of cutting devices may be utilized, including band saws, reciprocating saws, circular saws, guillotine knives, and lasers. Workpieces can be portioned in accordance with desired portion sizes, maximum fat content or thickness and other parameters.

Most of the portioned food products eventually undergo a cooking process before they are served or packaged. The size, shape, and other parameters of each portion affect how much cook time is required to properly cook (e.g., heat) the portion. In many cases, it is desirable that each of the multiple portioned pieces has a cook time within acceptable limits, so that they all can be cooked for an anticipatable period of time, and thus can be properly prepared in a controlled preparation system, having minimal variability. In the present description, the term "cook time" is used to refer to the amount of time required to properly or desirably cook a food product. Currently, however, portioning machines cut food products without regard to cook-time considerations for the resulting pieces. Therefore, those pieces that fail cook-time checks need to be rejected and discarded, after they have already been cut from the original product, creating undue waste. A need exists for a portioning machine that cuts products into pieces in accordance with various cook time considerations.

The present invention provides improvements to portioning machines of the foregoing general construction, to address the above-addressed need.

SUMMARY OF THE INVENTION

Processors of chicken and other meats need to make sure that raw cut pieces supplied to their customers meet the customers' requirements for cook-time considerations, such as cross-sectional dimensions, etc. In the case of a poultry or pork piece, while it is expected that its surface, edges, and any thin spots will likely reach and exceed a required minimum temperature, typically 165 F.°, relatively quickly, the middle of its thickest part probably will not reach this temperature during the same time. If a raw cut piece supplied to a customer exceeds these cross-sectional dimensions, cook-time checks will fail and the piece will be rejected.

If these cross-sectional dimensional requirements could be checked and adjusted at runtime on the processor's cutter, then all supplied raw cut pieces would meet the customer's requirements. For example, with regard to a portioning machine, this adjustment can be made prior to cutting based on the cross-sectional cook-time requirements.

According to one aspect, the present invention is directed to providing a system and method for achieving acceptable cook time. More specifically, one aspect of the present invention is directed to a system and method for automatically portioning food products into pieces having acceptable cook time. In another aspect, the present invention is directed broadly to a system and method for automatically portioning workpieces (not limited to food products) into pieces having acceptable process time (e.g., heating-process time).

According to one embodiment of the present invention, a method for achieving acceptable process time is provided. The method includes generally five steps. First, measurement data of a workpiece carried on a conveyor, such as dimensional data of the workpiece, are obtained upstream from a cutter. Second, a tentative cut path to portion the workpiece into one or more portions is defined, based on the obtained measurement data. Third, each portion is virtually divided into one or more (usually several) sections and process-time data (e.g., cook-time data) for each virtual section is calculated according to a predefined process-time algorithm. "Process-time data" means any data that can be correlated to (or affect) the virtual section's cook time. For example, in the case of food products, cook-time data for each virtual section may consist of certain cross-sectional dimension(s) of the virtual section, which need to fall within predefined constraints so as to achieve acceptable cook time. Fourth, it is determined whether the process-time data of each of all the virtual sections within the portion to be cut from the workpiece fall within the predefined process-time constraints. If yes, the tentative cut path is confirmed as acceptable, and the workpiece may be actually portioned according to the tentative cut path to produce the portion having acceptable process time for all of its virtual sections. If, on the other hand, not all the process-time data of virtual sections fall within the predefined process-time constraints, then fifth, the tentative cut path is redefined, and the method (routine) returns to the third step. This loop continues until the answer to the fourth step becomes yes, i.e., until the process-time data of each of all the virtual sections of the portion to be cut from the workpiece according to the "redefined" tentative cut path fall within the predefined process-time constraints.

In accordance with one aspect of the present invention, the workpieces to be portioned and processed are food material, and process-time data are cook-time data for each virtual food section. The cook-time data may consist of dimensional data of each virtual food section, such as cross-sectional dimensions of the virtual food section. Other cook-time data, such as other dimensional data and density data, may also be used.

According to another embodiment of the present invention, a method for achieving acceptable process time includes generally four steps. First, measurement data of a workpiece carried on a conveyor, such as dimensional data of the workpiece, are obtained upstream from a cutter. Second, a tentative cut path to portion the workpiece into one or more portions is defined, based on the measurement data. Third, for each portion, process-time data are calculated according to a predefined process-time algorithm and it is determined whether the process-time data fall within predefined process-time constraints. Fourth, if the process-time data for a portion do not fall within the predefined process-time constraints, the tentative cut path is redefined and the method returns to the third step above. As one example of calculating process-time data for a portion, the portion may be divided into one or more virtual sections, and process-time data for each virtual section may be calculated. Thereafter, process-time data representative of the process-time data of all of the one or more virtual sections may be selected as the process-time data for the entire portion.

The present invention further offers a system for achieving acceptable process time, suitable for executing a method of the present invention. The system includes generally four components: a conveyor for carrying workpieces to be portioned thereon; a scanner provided adjacent to the conveyor for scanning each workpiece to obtain scanning information therefrom; a cutter provided adjacent to the conveyor and downstream from the scanner for portioning the workpiece into portion(s) according to a cutting path; and a processor. The processor is coupled to the conveyor, the scanner, and the cutter, and is loaded with computer-executable instructions for automatically performing the following five steps. First, it takes measurement data of a workpiece carried on the conveyor based on the scanning information received from the scanner. Second, it defines a tentative cut path to portion the workpiece into portion(s) based on the measurement data. Third, it divides each portion into one or more virtual sections and calculates process-time data for each virtual section according to a predefined process-time algorithm. Fourth, it determines whether the process-time data of each of all the section(s) fall within predefined process-time constraints. Fifth, if the answer to the above inquiry in the fourth step is no, the processor redefines the tentative cut path and returns to the third step described above.

In accordance with one aspect of the invention, the system further includes a pickup device provided adjacent to the conveyor and downstream from the cutter to pick up portioned piece(s) from the conveyor. The pickup device may also be coupled to, and controlled by, the processor.

Accordingly, the present invention provides a method and system for automatically portioning workpieces, such as food material, into portioned pieces having acceptable process time (e.g., cook time). The method and system thereby significantly minimize the number of final products that need to be rejected for failing a process-time check.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Generally, the present invention pertains to checking or calculating one or more process-time pertinent data and making cutting decision changes based on the calculated data. A particularly useful application of the present invention is in cutting food products. While the following therefore generally describes the present invention as applied to food material so as to achieve acceptable cook time for portioned food pieces, it should be understood that the invention is not so limited and may be applied broadly to other types of products, including non-food products, to achieve acceptable process time (e.g., heating process time).

Figure 1:
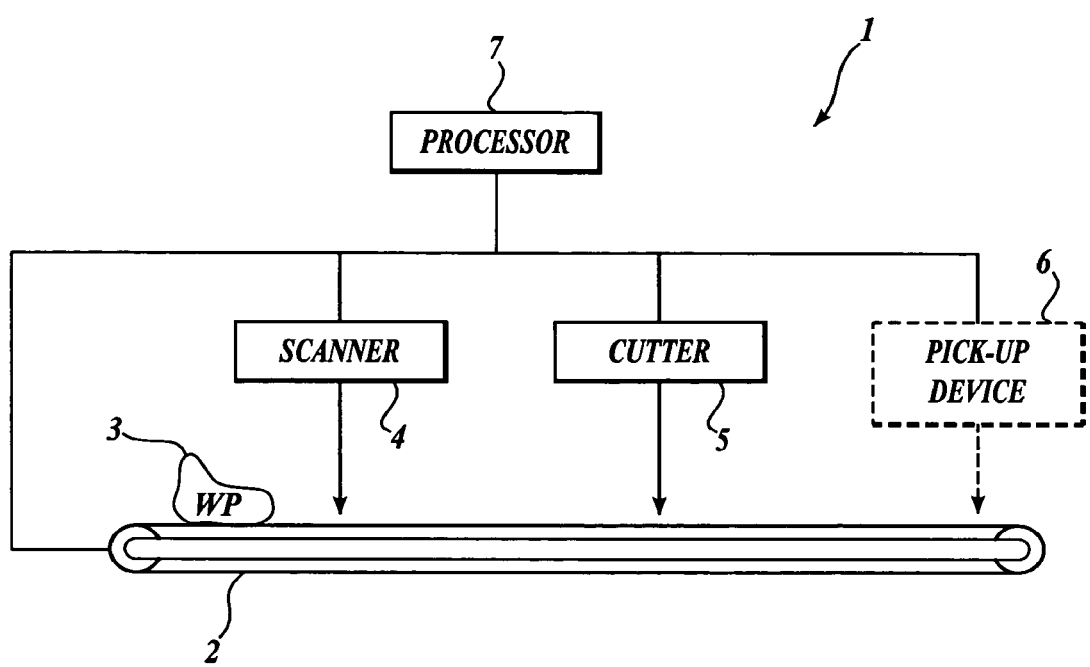
FIG. 1 is a schematic diagram illustrating a system for automatically portioning workpieces into portions (or pieces) having acceptable process time, according to one embodiment of the present invention.

FIG. 1 is a diagram illustrating the general configuration of a system suitable for use according to one embodiment of the present invention. The system 1 includes a conveyor 2, on which a workpiece 3 is carried along the direction of the illustrated arrow. Adjacent to the conveyor 2, a scanner 4, a cutter 5, and optionally a pickup device 6 are arranged. The conveyor 2, scanner 4, cutter 5, and pickup device 6 are all coupled to and controlled by a processor 7. Generally, as the workpiece 3 is carried on the conveyor 2, the scanner 4 scans the workpiece 3 to obtain its scanning information. The processor 7 then analyzes the scanning information to calculate a cut path suitable for obtaining desired portioned piece(s) from the workpiece 3, as known in the art. In the prior art, the processor 7 then controls the cutter 5 to portion the workpiece 3 into piece(s) according to the calculated cut path. Finally, the processor 7 may also control the pickup device 6 to pick up the portioned piece(s) from the conveyor 2.

According to the present invention, after the processor 7 calculates a "tentative" cut path for the workpiece 3 based on the scanned information obtained by the scanner 4, the processor 7 performs additional steps to ensure that the tentative cut path would portion the workpiece 3 into piece(s) having acceptable cook time, prior to actually cutting the workpiece 3.

Figure 2:
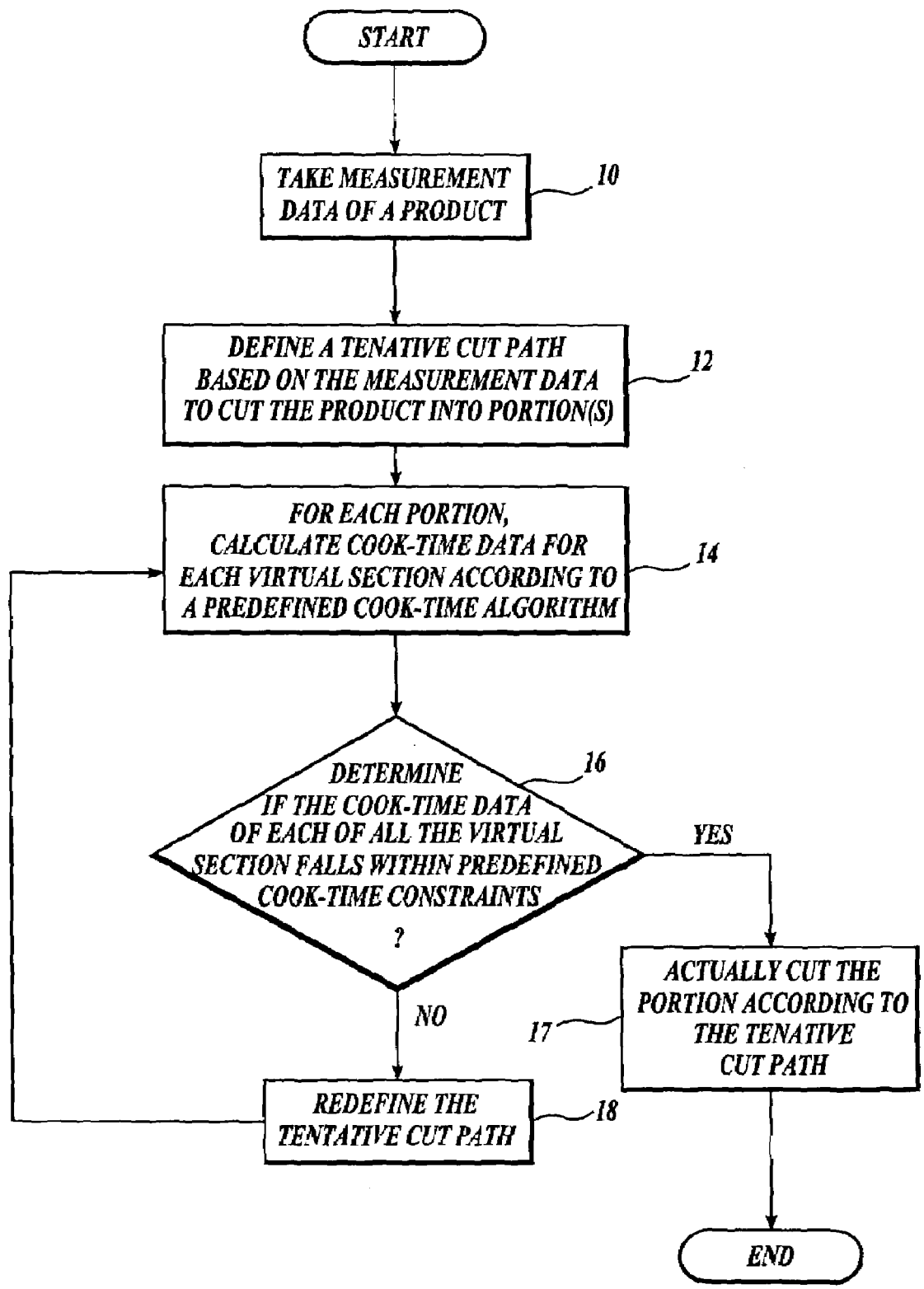
FIG. 2 is a flow diagram illustrating a method of automatically portioning workpieces into portions having acceptable process time, according to one embodiment of the present invention.

FIG. 2 is a flow chart illustrating steps involved in a method of automatically achieving acceptable cook time, according to one embodiment of the present invention. At step 10, each of a food product (the workpiece 3) carried on the processor conveyor 2 is scanned and its measurement data are obtained. The measurement data represent various physical parameters of the scanned product, such as its size, shape, weight, location and size of undesirable material, etc. The measurement data may then be used, in step 12, to calculate a tentative cut path for portioning the product into portion(s), as described in the background section above. At least some of the measurement data taken at step 10, however, may also be used to calculate cook-time data for each portion according to a predefined cook-time algorithm in step 14.

Figure 3A:
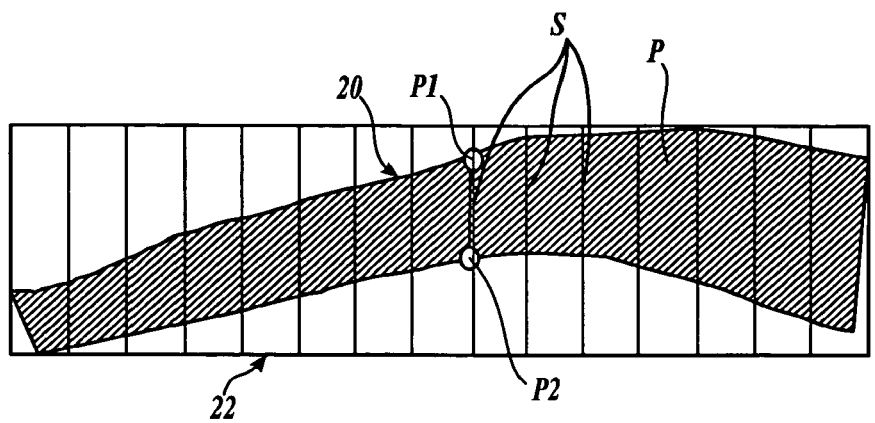
FIG. 3A is a schematic view of a tentative cut path for a workpiece portion analyzed for acceptable cook time of its virtual sections, according to one embodiment of the present invention.
Figure 4A:
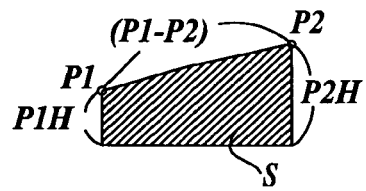
FIGS. 4A, 4B and 4C are schematic cross-sectional views of the virtual sections containing points P1 and P2, points P1' and P2', and points P1" and P2', respectively, according to one embodiment of the present invention.

For example, the measurement data may include data that can be used to calculate cross-sectional dimensions of one or more virtual sections of each portion to be cut from the product, which may then be analyzed according to a predefined cook-time algorithm. FIG. 3A represents a sample top view of a tentative cut path 20, as defined in step 12 (in FIG. 2), for a raw product according to one embodiment of the present invention. The portion to be cut "P" (shown as a shaded area) is bounded by a minimum-width rectangle 22. The tentative cut path 20 is defined so as to produce portion "P" (strip, nugget, etc.) having certain predefined physical parameters. In the illustrated embodiment, the rectangle 22 is virtually divided across its width into a number of sections "S" across the portion "P". For each virtual section "S," the points of intersection P1 and P2 with the portion "P" (shown shaded) are found. At these two edge points P1 and P2, the "height" of the P1 and P2 (into the page) and the distance between P1 and P2 are found. Referring additionally to FIG. 4A illustrating a cross-section of the virtual section "S" from which points P1 and P2 are found, P1H represents the height of P1, P2H represents the height of P2, and (P1–P2) represents the distance separating P1 and P2. As will be more fully described below, in step 14, P1H, P2H, and (P1–P2) are calculated and used according to a predefined cook-time algorithm. Therefore, the measurement data taken at step 10 include at least some data that can be used to calculate P1H, P2H, and (P1–P2).

In step 14, at least some of the measurement data are used to calculate cook-time data for each virtual section of a portion according to a predefined cook-time algorithm. "Cook-time data" of a section refers to any data that can be correlated to the section's desirable cook time. For example, cook-time data may be a section's cross-sectional dimensions, thickness, density, etc. In the case of cross-sectional dimensions, for example, certain cross-sectional dimensions should not exceed predefined constraints so as to achieve acceptable cook time. As one specific example of a cook-time algorithm, the heights of points P1 and P2—P1H and P2H—and also the distance between points P1 and P2—(P1–P2)—are calculated, as described above. Then, the greater of P1H and P2H is compared to (P1–P2), and the smaller of these two numbers is designated as the relevant cook-time data for this particular cross-section. In the illustrated example of FIG. 4A, P2H is greater than P1H, and P2H is smaller than (P1–P2), and therefore P2H is designated as the cook-time data for this particular cross-section.

In step 16 of FIG. 2, it is determined if the calculated cook-time data for each of all the cross-sections (or virtual sections) fall within predefined cook-time constrains. For example, following the above-described example, the largest "cook time data" of a number of cross-sections is taken as the "cook time data" for the whole portion "P" (i.e., the final product to be cut out), and then is compared with a user-set threshold value. For example, if P2H calculated as the cook-time data of the particular cross-section is larger than the cook-time data of any other cross-section, then P2H is considered as the cook-time data of the whole portion and is compared against a use-defined threshold value.

If the cook time data (P2H in this example) is less than the threshold limit, that means that all of the virtual sections within the portion to be cut according to the tentative cut path would satisfy the user-defined cook time constraints, and hence this portion would pass the cook-time checks. Accordingly, proceeding to step 17, the product may be actually cut according to the tentative cut path defined in step 12 to produce the portioned product. On the other hand, if the cook-time data is greater than the threshold limit, that means that at least some virtual section(s) within the portion to be cut would not satisfy the user-defined cook-time constrains, and therefore the tentative cut path need to be redefined. In one embodiment, such finding (i.e., that at least some virtual section(s) would not satisfy the user-defined cook-time constraints) may be reported to an operator, who may then manually redefine the tentative cut path. In another embodiment, as shown in FIG. 2, at step 18, the process automatically redefines the tentative cut path, and returning to step 14, the cook-time data for each virtual section of a portion to be cut based on the "redefined" tentative cut path are calculated. Thereafter, in step 16, it is determined whether the cook-time data of all the virtual sections of the portion to be cut based on the redefined tentative cut path would satisfy the predefined cook-time constraints. The process thus continues (loops) until it is confirmed that the tentative cut path would produce a portion in which all of its virtual sections would satisfy the user-defined cook-time constraints.

Figure 3B:
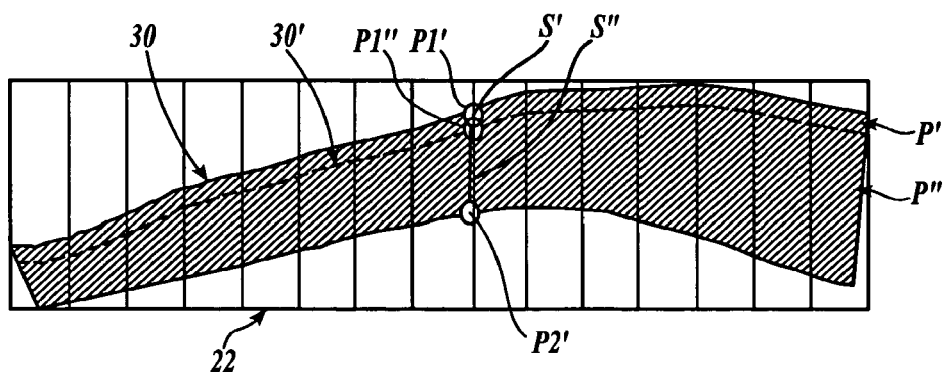
FIG. 3B is a schematic view of a "redefined" tentative cut path for the workpiece portion of FIG. 3A, according to one embodiment of the present invention.
Figure 4B:
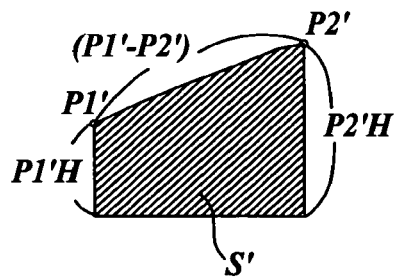
Figure 4C:
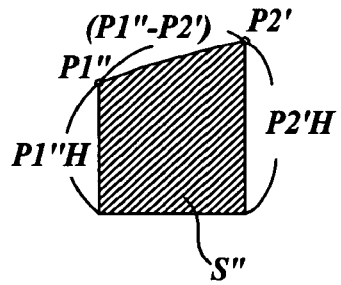

For example, referring to FIG. 3B showing a top view of another portion P' to be cut, one virtual section S' is defined by its edge points P1' and P2', in a similar manner as discussed above. Referring additionally to FIG. 4B, which represents a cross-section of this virtual section, according to the cook-time algorithm discussed above, P2'H is greater than P1'H, and also is smaller than (P1'–P2') and, therefore, P2'H is the cook-time data for this virtual section. Assuming that P2'H is the largest (thus representing the whole portion P'), if it is determined that P2'H exceeds the predefined threshold limit, the tentative cut path needs to be redefined. This can be accomplished, for example, by moving an original upper cut path 30 to a new cut path 30' to produce a newly defined portion P" having a reduced-size virtual section S" defined by edge points P1" and P2', as shown in FIGS. 3B and 4C. As illustrated, the point height P2'H is greater than P1 "H, but is also greater than the distance between the two points (P1"–P2'). Therefore, the cook-time data for this newly defined virtual section S" becomes (P1 "–P2'). If all the cook-time data calculated in the same manner for all the redefined virtual sections are within the predefined cook-time constraints, then the redefined tentative cut path including the upper cut path 30' is confirmed as acceptable and used as an actual cut path to produce a portioned product.

As apparent from the above description, the present invention provides a method and system for automatically portioning a workpiece into pieces that have acceptable process time, such as acceptable cook time. The method and system therefore greatly reduce the number of rejects which, although portioned into pieces satisfying certain dimensional parameters, still need to be discarded for not satisfying process-time constrains. Accordingly, the present invention significantly improves the overall efficiency of portioning operation while minimizing waste.

While the preferred embodiments of the invention have been illustrated and described, it will be appreciated that various changes can be made therein without departing from the spirit and scope of the invention. For example, the method and system described in detail above represent only one way of measuring cook-time considerations, and other cook-time (or process-time) algorithms could also be applied in the same manner before making runtime cutting decisions. As a specific example, instead of cross-sectional dimensions of each piece to be portioned from a product, the density value (e.g., average density) of each piece to be portioned may be used in a cook-time algorithm.

The embodiments of the invention in which an exclusive property or privilege is claimed are defined as follows:

1. A method of achieving acceptable process time for a portion cut from a workpiece, comprising:
   (a) taking measurement data of a workpiece carried on a conveyor upstream of a cutting device;
   (b) defining a tentative cut path for the workpiece to cut the workpiece into portion(s) based on the measurement data;
   (c) dividing a portion into one or more virtual sections and calculating process-time data for each section according to a predefined process-time algorithm;
   (d) determining whether the process-time data of each of the section(s) falls within predefined process-time constraints; and
   (e) if one or more sections does not fall within the predefined process-time constraints, redefining the tentative cut path and returning to step (c) above.

2. The method of claim 1, wherein the workpiece comprises food material and the process-time data comprise cook time data.

3. The method of claim 2, wherein the cook-time data comprise dimensional data of each section.

4. The method of claim 3, wherein the dimensional data comprise cross-sectional dimensional data of each section.

5. The method of claim 4, wherein the cross-dimensional data comprise a transverse dimension that extends generally in parallel to the plane of the conveyor.

6. The method of claim 4, wherein the cross-dimensional data comprise a height dimension that extends generally perpendicularly to the plane of the conveyor.

7. The method of claim 4, wherein step (c) of calculating cook-time data for each section comprises:
   calculating a transverse dimension of each section, the transverse dimension extending generally in parallel to the plane of the conveyor;
   calculating a height dimension that extends generally perpendicularly to the plane of the conveyor; and
   selecting the smaller of the transverse dimension and the height dimension as the cook-time data.

8. The method of claim 2, wherein the cook-time data comprise density data of each section.

9. A system for achieving acceptable process time for a portioned piece cut from a workpiece, the system comprising:

a conveyor for carrying workpieces to be portioned;

a scanner for scanning each workpiece to obtain scanning information of the workpiece;

a cutter provided adjacent to the conveyor and downstream from the scanner for portioning the workpiece into portioned piece(s) according to a cutting path; and a processor coupled to the conveyor, the scanner, and the cutter, the processor comprising computer-executable instructions for automatically performing the steps of:

(a) taking measurement data of a workpiece carried on the conveyor based on the scanning information received from the scanner;

(b) defining a tentative cut path to portion the workpiece into portioned piece(s) based on the measurement data;

(c) dividing a portioned piece into one or more virtual sections and calculating process-time data for each section according to a predefined process-time algorithm;

(d) determining whether the process-time data of each of all the section(s) fall within predefined process-time constraints; and (e) if one or more sections does not fall within the predefined process-time constraints, redefining the tentative cut path and returning to step (c) above.

10. The system of claim 9, further comprising a pickup device provided adjacent to the conveyor and downstream from the cutter to pick up portioned piece(s) from the conveyor.

11. The system of claim 9, wherein the workpiece comprises food material and the process-time data comprise cook time data.

12. The system of claim 11, wherein the cook-time data comprise dimensional data of each section.

13. The system of claim 12, wherein the dimensional data comprise cross-sectional dimensional data of each section.

14. The system of claim 13, wherein the cross-dimensional data comprise a transverse dimension that extends generally in parallel to the plane of the conveyor.

15. The system of claim 13, wherein the cross-dimensional data comprise a height dimension that extends generally perpendicularly to the plane of the conveyor.

16. The system of claim 13, wherein step (c) of calculating cook-time data for each section comprises:

calculating a transverse dimension of each section, the transverse dimension extending generally in parallel to the plane of the conveyor;

calculating a height dimension that extends generally perpendicularly to the plane of the conveyor; and selecting the smaller of the transverse dimension and the height dimension as the cook-time data.

17. The system of claim 11, wherein the cook-time data comprise density data of each section.

18. A system for achieving acceptable process time for a portion cut from a workpiece, the system comprising:

a conveyor for carrying workpieces to be portioned;

a scanner for scanning each workpiece to obtain scanning information of the workpiece;

a cutter provided adjacent to the conveyor and downstream from the scanner for portioning the workpiece into portion(s) according to a cutting path; and a processor coupled to the conveyor, the scanner, and the cutter, the processor comprising computer-executable instructions for automatically performing the steps of:

(a) taking measurement data of a workpiece carried on the conveyor based on the scanning information received from the scanner;

(b) defining a tentative cut path to portion the workpiece into portion(s) based on the measurement data;

(c) for each portion, calculating process-time data according to a predefined process-time algorithm, and determining whether the process-time data of each portion fall within predefined process-time constraints; and (d) if the process-time data for a portion do not fall within the predefined process-time constraints, redefining the tentative cut path and returning to step (c) above.

19. The system of claim 18, wherein step (c) of calculating process-time data for each portion comprises:

virtually dividing the portion into one or more sections;

calculating process-time data for each virtual section according to the predefined process-time algorithm; and selecting process-time data that are representative of the process-time data of all virtual sections.

20. The system of claim 19, wherein the workpiece comprises food material and the process-time data comprise cook time data.

* * * * *